(12) United States Patent
Gatlin et al.

(10) Patent No.: US 8,966,041 B1
(45) Date of Patent: Feb. 24, 2015

(54) SYSTEM AND METHOD FOR MANAGING INFORMATION TECHNOLOGY INFRASTRUCTURE

(75) Inventors: Duke Gatlin, Houston, TX (US); Lee Williams, Hendersonville, TN (US)

(73) Assignee: Digital Connections, Inc., Hendersonville, TN (US)

( * ) Notice: Subject to any disclaimer, the term of this patent is extended or adjusted under 35 U.S.C. 154(b) by 0 days.

(21) Appl. No.: 13/212,087

(22) Filed: Aug. 17, 2011

Related U.S. Application Data

(60) Provisional application No. 61/374,538, filed on Aug. 17, 2010.

(51) Int. Cl.
*G06F 15/173* (2006.01)

(52) U.S. Cl.
USPC .......................................... 709/223; 709/224

(58) Field of Classification Search
CPC .. H04L 41/0213; H04L 43/08; H04L 43/0817
USPC ................................................ 709/223, 224
See application file for complete search history.

(56) References Cited

U.S. PATENT DOCUMENTS

| | | | | |
|---|---|---|---|---|
| 7,895,320 B1 * | 2/2011 | Oggerino et al. | ............. | 709/224 |
| 8,145,748 B2 * | 3/2012 | Denis et al. | .................... | 709/224 |
| 2002/0052950 A1 * | 5/2002 | Pillai et al. | ..................... | 709/224 |
| 2003/0101262 A1 * | 5/2003 | Godwin | ......................... | 709/224 |
| 2004/0039805 A1 * | 2/2004 | Connelly et al. | .............. | 709/223 |
| 2005/0010461 A1 * | 1/2005 | Manos | ................................ | 705/8 |
| 2006/0053094 A1 * | 3/2006 | Ravi et al. | .......................... | 707/3 |
| 2007/0083628 A1 * | 4/2007 | Sandstrom | ..................... | 709/223 |
| 2007/0192236 A1 * | 8/2007 | Futch et al. | ...................... | 705/38 |
| 2008/0066145 A1 * | 3/2008 | Molen et al. | ...................... | 726/1 |
| 2008/0126836 A1 * | 5/2008 | DiZoglio et al. | .............. | 709/217 |
| 2009/0077434 A1 * | 3/2009 | Furuhjelm et al. | ............. | 714/710 |
| 2010/0125912 A1 * | 5/2010 | Greenshpon et al. | ........... | 726/25 |
| 2011/0213821 A1 * | 9/2011 | Gentile et al. | ................. | 709/202 |
| 2011/0302462 A1 * | 12/2011 | Roshen et al. | ................... | 714/57 |

* cited by examiner

*Primary Examiner* — Philip B Tran
(74) *Attorney, Agent, or Firm* — David E. Mixon; Bradley Arant Boult Cummings LLP

(57) ABSTRACT

A system for developing and managing information technology infrastructure management and operations has been developed. The system includes establishing a remote system help desk to clear IMO problems based on severity. Also, a remote network operations center (NOC) is established to monitor system equipment and provide IMO incident management and remediation. Additionally, a staging center is established to perform setup, configuration and testing of system upgrades and new equipment installations. Finally, a report for system status and performance for storage in an electronic media is generated.

9 Claims, 2 Drawing Sheets

Critical Sev 1 –
(a) more than 10% of users are unable to access the network or
(b) more than 10% of users are unable to use the telecommunications systems,
(c) a critical business process is substantially unavailable, or
(d) a customer designated VIP is seriously impacted; and, in each case, no appropriate workaround is available.
*Response Time:*    *2 Business Hours*                          *TTR (Total time to repair) 4 Business hours*

Important Sev 2 -
(a) an incident affecting one or more end users resulting in significant service degradation that also has significant business impact to the affected organization and for which no appropriate workaround is available or
(b) a situation that would otherwise be a Severity 2 problem except that an appropriate workaround is available.
*Response Time:*    *4 Business Hours*                          *TTR (Total time to repair) 8 Business hours*

Standard Sev 3 – All other service problems.
*Response Time:*    *NBD (next business day)*          *TTR (Total time to repair) 24 Business hours*

Standard Sev 4 – Routine tickets that requires installation, move, add or change to a piece of equipment or cabling.
*Response Time:*    *3 Business Days*

MAC 3-5 – Sev 5 Routine tickets that requires installation, move, add or change to a piece of equipment or cabling
*Response Time:*    *5 Business days*

Managed MAC – Sev 6 – MAC tickets that have special requirements and are tickets that requires installation, move, add or change to a piece of equipment or cabling
*Response Time:*    *5 Business days from equipment arrival on site*

Small Projects or Monthly Tickets - Sev 7 – Small projects or quoted tickets for monthly work.
*Response Time:*    *Individual Case Basis – No SLA attached*

Projects – Quoted contract projects and jobs.
*Response Time:*    *Individual Case Basis – No SLA attached*

FIG. 2

SYSTEM AND METHOD FOR MANAGING INFORMATION TECHNOLOGY INFRASTRUCTURE

CROSS-REFERENCE TO RELATED APPLICATIONS

This application claims priority from U.S. Provisional Patent No. 61/374,538 entitled "System and Method for Managing Information Technology Infrastructure" that was filed on Aug. 17, 2010.

FIELD OF THE INVENTION

The invention relates generally to a system for managing information technology infrastructure.

BACKGROUND ART

Over the past years, information technology (IT) systems for business and other similar organizations have become very fractured. The IT systems are typically inter-related but not inter-dependent. For example, a trunk port had to work on the PBX for the router to work but the phone system would work whether their network security was up or not. The surveillance camera system operated on a separate coaxial cabling system and was completely independent of IT system. E-mail didn't depend on the phone system working and conversely the voice messages didn't depend on their e-mail working. Thus, it is still common to think in "stovepipe" terms even though the technology has become converged.

Many businesses, because of the historical nature of a widely fractured network infrastructure topology, still view IT from a historical perspective. For example, many organize their IT department—Director, Telecommunications; Director—Network Administration; Manager—Network Security; Server Manager; Desktop Support Services, etc. This tells you that their IT infrastructure is viewed from a historical, fragmented perspective. Companies experience "turf wars" because each department does not have in-depth understanding of how their components interface and affect other departmental components. Compound this much fractured structure with each of these departments depending on multiple IT "stovepipe" vendors and one can quickly see why IT infrastructure has become so frustrating.

In actuality, providing the ability for devices to have digital communications—whether it is to a camera, a phone, a desktop, laptop, PDA, digital sign, or any other end user device, is now quickly advancing towards a converged network and all devices (as well evidenced by phones, signage, cameras, etc.) are just becoming another end-user device powered by an IP address. However, many organizations are realizing that this type of organizational structure flies in the face of the converged network. Consequently, this connectivity must be delivered by a system reliably, quickly, and securely.

SUMMARY OF THE INVENTION

In some aspects, the invention relates to a system for developing and managing information technology infrastructure management and operations (IMO), comprising: establishing a remote system help desk to clear IMO problems based on severity; establishing a remote network operations center (NOC) to monitor system equipment and provide IMO incident management and remediation; establishing a staging center to perform setup, configuration and testing of system upgrades and new equipment installations; and generating a IMO report for system status and performance for storage in an electronic media.

In other aspects, the invention relates to a system for developing and managing information technology infrastructure management and operations (IMO), comprising: step for establishing a remote system help desk to clear system problems based on severity classification; step for establishing a remote network operations center (NOC) to monitor system equipment and provide equipment problem remediation; step for establishing a staging center to perform setup, configuration and testing of system upgrades and new system installations; and step generating and storing a IMO report for system status and performance for in an electronic media.

Other aspects and advantages of the invention will be apparent from the following description and the appended claims.

BRIEF DESCRIPTION OF DRAWINGS

It should be noted that identical features in different drawings are shown with the same reference numeral.

FIG. 2 shows a listed of service call classifications and performance standards in accordance with one embodiment of the present invention.

DETAILED DESCRIPTION

Figure 1:
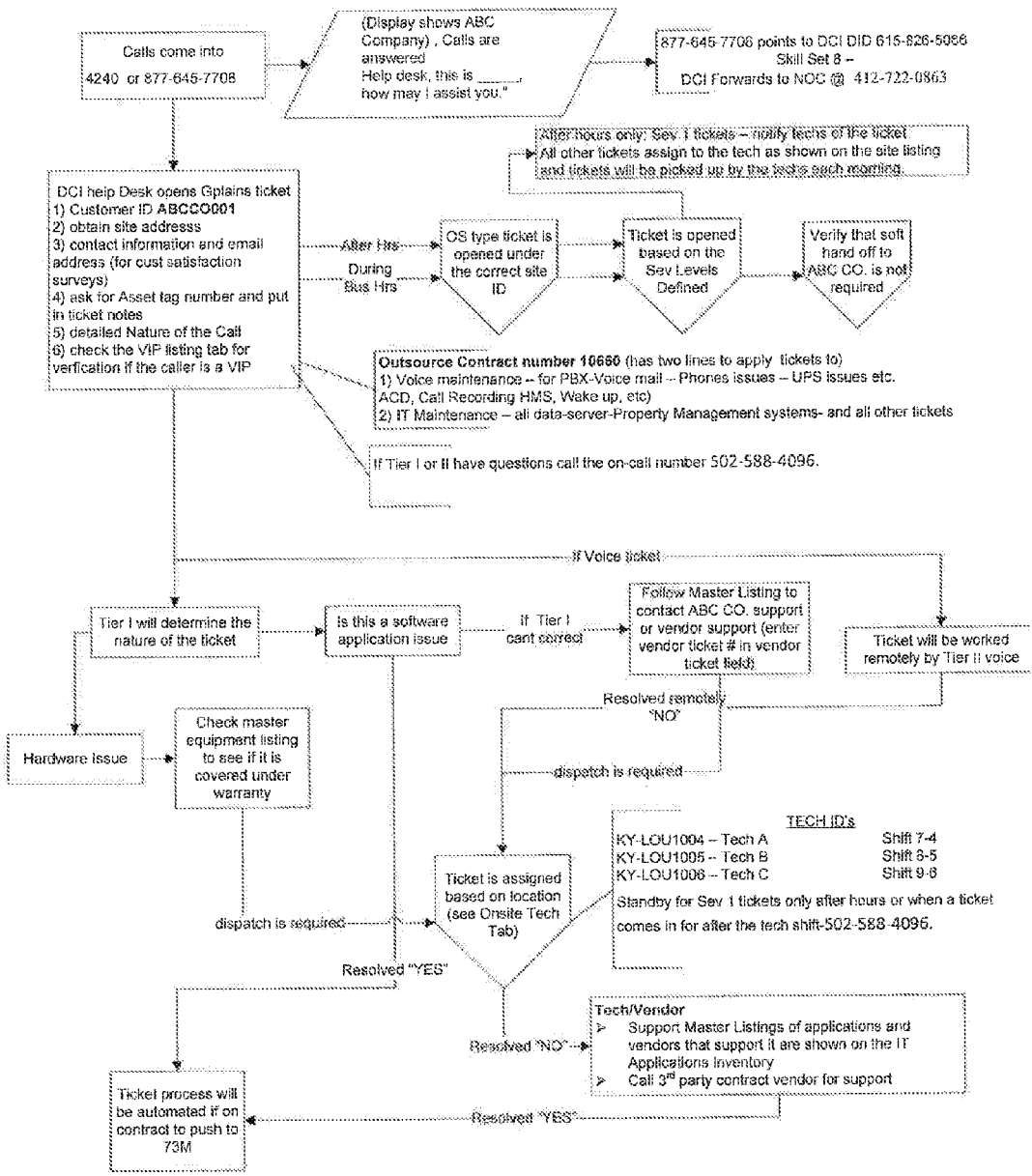
FIG. 1 shows a IMO process decision tree chart for service calls in accordance with one embodiment of the present invention.

The present invention is a system and method for designing, managing and operating IT infrastructure for an organization. In some embodiments, the invention develops an Infrastructure Management and Operations (IMO) plan that optimizes an organization's IT infrastructure. The IMO allows the organization to outsource to third party assets to dramatically improve their operations by using:

A third party Help Desk (Tiers 1 through 3) remotely clears problems and thus lowers IT problem resolution times;

A third party NOC (Network Operations Center) that monitors equipment, allows incident management and provides remote remediation. Perhaps more importantly, it provides predictive, pro-active monitoring which can predict and eliminate problems before they occur and affect the organization's operations;

A third party Staging Center and Lab that performs pre-staging, burn-in, and configuration testing and verification so that new applications or upgrades to applications do not adversely affect the organization's production systems;

Specialized technical personnel (the ATG) that allows the organization's operations to incur less downtime in IT infrastructure, eliminates "finger pointing" between multiple vendors and manufacturers, and resolves IT problems much more quickly. Additionally, specialists who understand particular areas of IT infrastructure, while understanding how their related area relates to the network as a whole, can significantly improve network up-time and resolve problems in a fraction of the time that organizations experience when providing their own (and fractured vendor) support; and Finally, through generated reports, organizations can much better gauge their IT effectiveness and efficiencies.

FIG. 1 decision tree chart for service calls for a fully developed IMO plan in example of the present invention.

FIG. 2 shows an example of service call classifications and performance standards in accordance with the IMO plan of FIG. 1.

In a preferred embodiment, the present invention is directed towards an organization with 100 to 2,000 employees. Organizations within this size range have many of the same sophisticated IT needs as larger organizations yet have even less ability to scale. Organizations, smaller than this range, may not need very sophisticated IT services and can be served by retail-like IT entities. Larger organizations may feel that they are big enough to provide their own scale. However, it should be understood that the present invention could be applied to organizations outside this size range as well.

In order to deliver true value to an organization over time, the IMO development process must intimately understand its business objectives, its values and its culture. As a part of this, the IMO development process must also understand the organization's IT infrastructure architecture and operations and the business application functionality it is intended to deliver. The reality of a converged enterprise IP network backbone populated by many discreet, yet interdependent elements, requires a holistic view as well.

The IMO development process acquires knowledge of an organization's IT system during an assessment phase. The assessment phase is ideally conducted in a non-disruptive manner to the organization's normal operations. The goal of the assessment is to gain an understanding of the interfaces, the interactions and interdependencies of the multiple devices, usually from multiple manufacturers, on the IT network. It is completely focused on how to optimize the design, management and operation of that heterogeneous network including: initial conceptual architectural design; predictive NOC monitoring; routine help desk and field support; high-level, specialized expertise; and objectively and quantitatively measuring the end user satisfaction. During the assessment phase, the IMO process: gathers the basic information about the organization's logical architectural design and its current infrastructure; analyzes the organization's operational support systems, processes and policies and future plans; meets the organization's leadership and observes the business environment first hand and gains insight into the organization's culture and values; and develops a specific scope of work (SOW) and a cost model to propose the framework for a detailed, customized long term IMO plan.

Prior to beginning the assessment phase, the following should be clearly identified about the organization: (a) what does it do? (b) how many locations do it have? (c) how many employees does it have? (d) what are its annual sales? (e) Is it profitable or losing money? (f) What are its biggest challenges from a business perspective? and (g) What are its largest challenges from an IT perspective? (h) What seems to be the biggest "pain point" regarding IT? (i) How many IT employees does it have? (j) How many maintenance contracts do they have? (k) Does it use a lot of outside resources? (l) Who is its carrier? (m) How well is the IT managed? (n) What level of sophistication do they have? (o) Do they get any type of reports, and, if so, are they available? (p) Does the prospect utilize any type of Helpdesk or NOC services? (q) Are these capabilities provided from an "in house" solution or do they use a vendor? and (r) Do they utilize co-location facilities?

Additionally, the following information is typically gathered during the assessment phase: Estimated number of service tickets or problems; Existing maintenance requirements; Amount of outside vendor support; Personnel and their roles and responsibilities; Types of systems and numbers of devices; Who and which of the organization's team members are responsible for what equipment; How much time should be taken in its assessment process; and Limits of the potential scope the assessment phase.

As a general rule, the more information, relevant to the IT infrastructure obtained, the better. A specific check list or group of reports are not provided for the assessment phase because every organization is unique. Therefore, this list will vary greatly in different applications. The ultimate goal of the assessment phase is identify and understand the organization's: (a) cable infrastructure position; (b) server capabilities; (c) network security condition; (d) wireless situation; (e) ability to operate on a VOIP platform; (f) monitoring needs; (g) specific reports that need to better management and measurement of IT performance; (h) video-conferencing, IP security, and digital signage requirements (or the ability to add them if desired); (i) IP addressing schemes; (j) routing and switching capacities; (k) exactly how a help desk should be integrated into the processes; and (l) assessing staff and vendors and recognizing how they should be transitioned into the IMO model. It should be understood that other features of the organization could be recognized during the assessment phase that will impact the IMO process.

In summary, the Assessment phase is a powerful and central point of success with an IMO process. It gathers the information and understanding and generates the SOW and Cost Model. There are many details as exactly how and when things are laid out that are left to the transition phase. After the SOW is executed, a transition phase will map out a specific project plan and incorporate the hundreds of detailed steps to evolve the organization from its current state to the future state and then to ongoing business as usual operations.

The entire advantage of the IMO process of the present invention is relatively simple. It helps mid-sized companies meet their IT needs at a competitive cost with a dramatic positive results in the core operations. More specifically, the present invention has the following advantages: Using a single vendor and avoiding the "finger pointing" syndrome when attempting to get problems resolved with several vendors; Confidence with the security of the entire network; Avoiding augmentation of in-house IT staff by outside resources in order to achieve their IT objective; IT projects brought in consistently on time and on budget; Ease of handling remote location support; Cost effective IT field support resources; Pro-actively determining problems before they occur; Resolving a high percentage of IT problems remotely; Ability to handle technology issues that fall outside in-house IT staff's competency range; Ability to handle problems when in-house IT staff members are out due to sickness, vacation, or training; Selecting hardware that properly supports the application software; and Synchronizing all IT/Voice maintenance contracts to be coterminous and match the budget cycle.

While the invention has been described with respect to a limited number of embodiments, those skilled in the art, having benefit of this disclosure, will appreciate that other embodiments can be devised which do not depart from the scope of the invention as disclosed here. Accordingly, the scope of the invention should be limited only by the attached claims.

What is claimed is:

1. A method for developing and managing information technology (IT) infrastructure management and operations (IMO) for an IT system, comprising:

establishing a remote system help desk to clear IMO problems based on a severity classification of the problem, server capability of the IT system, staff support capabilities, vendor support capabilities;

establishing a remote network operations center (NOC) to monitor system equipment and provide IMO incident management and remediation;

establishing a remotely located staging center to perform pre-installation sparing, cost modeling, staging, burn-in and configuration testing of system software upgrades and pre-installation sparing, cost modeling, staging, burn-in and configuration testing of new hardware equipment installations; and generating a IMO report for system status and performance for storage in an electronic media.

2. The method of claim 1, where the IT system is established based on cable infrastructure.

3. The method of claim 1, where the IT system is established based on network security capability.

4. The method of claim 1, where the IT system is established based on wireless network capability.

5. The method of claim 1, where the IT system is established VOIP capability.

6. The method of claim 1, where the IT system is established based system reporting requirements.

7. The method of claim 1, where the IT system is established based on routing and switching capabilities.

8. The method of claim 1, where the IT system is established based on IP addressing requirements.

9. A method for developing and managing information technology infrastructure management and operations (IMO) for an IT system, comprising:

step for establishing a remote system help desk to clear system problems based on severity classification of the problems, server capability of the IT system, staff support capabilities, vendor support capabilities;

step for establishing a remote network operations center (NOC) to monitor system equipment and provide equipment problem remediation;

step for establishing a remotely located staging center to perform pre-installation sparing, cost modeling, staging, burn-in and configuration testing of system software upgrades and pre-installation sparing, cost modeling, staging, burn-in and configuration testing of new hardware equipment installations; and step generating and storing a IMO report for system status and performance for in an electronic media.

* * * * *